US012776573B2

(12) United States Patent
Shigematsu et al.

(10) Patent No.: US 12,776,573 B2
(45) Date of Patent: Oct. 27, 2026

(54) WIRELESS MODULE

(71) Applicant: Fujikura Ltd., Tokyo (JP)

(72) Inventors: Noriaki Shigematsu, Sakura (JP); Masao Mori, Sakura (JP); Kiyoshi Kobayashi, Sakura (JP); Yuki Suto, Sakura (JP)

(73) Assignee: Fujikura Ltd., Tokyo (JP)

( * ) Notice: Subject to any disclaimer, the term of this patent is extended or adjusted under 35 U.S.C. 154(b) by 250 days.

(21) Appl. No.: 18/411,432

(22) Filed: Jan. 12, 2024

(65) Prior Publication Data

US 2024/0250405 A1 Jul. 25, 2024

(30) Foreign Application Priority Data

Jan. 23, 2023 (JP) ................................ 2023-008225

(51) Int. Cl.
*H01Q 1/42* (2006.01)
*H01Q 1/48* (2006.01)
*H01Q 21/06* (2006.01)

(52) U.S. Cl.
CPC ................ *H01Q 1/42* (2013.01); *H01Q 1/48* (2013.01); *H01Q 21/061* (2013.01)

(58) Field of Classification Search
None
See application file for complete search history.

(56) References Cited

U.S. PATENT DOCUMENTS 10,784,589 B2 * 9/2020 Toyao .................. H01Q 21/062
12,224,477 B2 * 2/2025 Kim ......................... H01Q 1/02
12,276,749 B2 * 4/2025 Zhou .................... H01Q 1/3233
12,355,131 B2 * 7/2025 Mochizuki ........... H01Q 21/064
12,374,782 B2 * 7/2025 Yang ........................ H01Q 1/02
2001/0040524 A1 * 11/2001 Suzuki ................... H01Q 23/00 342/175
2005/0224246 A1 * 10/2005 Gottwald ............. H01Q 9/0414 174/359
2007/0159380 A1 * 7/2007 Nagaishi ............... H01L 23/552 257/E25.031
2008/0062038 A1 * 3/2008 Ouchi ..................... G01S 7/032 342/175
2018/0358710 A1 * 12/2018 Toyao .................. H01Q 15/148
2019/0036225 A1 * 1/2019 Kosaka .................... H01Q 7/00
2020/0021005 A1 * 1/2020 Kosaka .................... H01Q 1/42
(Continued)

FOREIGN PATENT DOCUMENTS

JP 9-83233 A 3/1997
JP 2002-190708 A 7/2002
(Continued)

*Primary Examiner* — Ab Salam Alkassim, Jr.
(74) *Attorney, Agent, or Firm* — WHDA, LLP

(57) ABSTRACT

A wireless module includes a first board having an antenna, the antenna transmitting and receiving a high frequency signal in a millimeter wave band, a second board handling a baseband signal with a lower frequency than the high frequency signal, and a housing including a cover and a case combined with each other and accommodating the first board and the second board, in which a passage portion that allows electromagnetic waves transmitted and received by the antenna to pass through is provided in the cover, and the first board is fixed to the cover while being in contact with the cover.

15 Claims, 11 Drawing Sheets

(56) References Cited

U.S. PATENT DOCUMENTS

| | | | | |
|---|---|---|---|---|
| 2023/0273295 | A1* | 8/2023 | Ohara | G01S 13/931<br>342/350 |
| 2024/0250401 | A1* | 7/2024 | Shigematsu | H01Q 1/22 |
| 2024/0275055 | A1* | 8/2024 | Zhang | H01Q 1/22 |

FOREIGN PATENT DOCUMENTS

| | | | |
|---|---|---|---|
| JP | 4577224 | B2 | 11/2010 |
| WO | 2017/068837 | A1 | 4/2017 |
| WO | 2018/110083 | A1 | 6/2018 |
| WO | 2022/144983 | A1 | 7/2022 |

* cited by examiner

WIRELESS MODULE

BACKGROUND OF THE INVENTION

Field of the Invention

The present invention relates to a wireless module.

Priority is claimed on Japanese Patent Application No. 2023-008225 filed on Jan. 23, 2023, the content of which is incorporated herein by reference.

Description of Related Art

Patent Document 1 discloses a wireless module having a structure in which an antenna, an RF board, and a control board are accommodated in one housing.

PATENT DOCUMENTS

[Patent Document 1] Japanese Patent No. 4577224

SUMMARY OF THE INVENTION

For example, in the wireless module described in Patent Document 1, when a positional deviation occurs between the antenna and the housing, electromagnetic waves transmitted and received by the antenna may interfere with the housing, or a polarization angle of the antenna may vary. Such interference of the electromagnetic waves and variation in the polarization angle lead to deterioration of performance of the wireless module, that is, wireless performance.

The present invention was made in consideration of such circumstances, and an object thereof is to provide a wireless module capable of curbing deterioration of wireless performance caused by positional deviation between an antenna and a housing.

In order to solve the above problems, a wireless module according to a first aspect of the present invention includes a first board having an antenna, the antenna transmitting and receiving a high frequency signal in a millimeter wave band, a second board handling a baseband signal with a lower frequency than the high frequency signal, and a housing including a cover and a case combined with each other and accommodating the first board and the second board, in which a passage portion that allows electromagnetic waves transmitted and received by the antenna to pass through is provided in the cover, and the first board is fixed to the cover while being in contact with the cover.

According to the first aspect of the present invention, the first board having the antenna is directly fixed to the cover having the passage portion. Thus, it is possible to easily maintain a positional relationship between the antenna and the passage portion. Therefore, it is possible to curb deterioration of wireless performance caused by positional deviation between the antenna and the housing.

Also, according to a second aspect of the present invention, in the wireless module of the first aspect, the first board may not be fixed to the case.

Also, according to a third aspect of the present invention, in the wireless module of the first or second aspect, the first board may include a first connector, the second board may include a second connector, and the first connector and the second connector may be directly electrically connected together.

Also, according to a fourth aspect of the present invention, in the wireless module of any one of the first to third aspects, the passage portion may be provided so that a Fresnel zone of the antenna and the cover do not interfere with each other.

Also, according to a fifth aspect of the present invention, in the wireless module of any one of the first to fourth aspects, the first board may have a plurality of positioning holes that position and fix the first board with respect to the cover.

Also, in the wireless module of any one of the first to fifth aspects, a sixth aspect of the present invention may further include a through screw that passes through the case, the first board and the cover to fix the case to the cover.

Also, according to a seventh aspect of the present invention, in the wireless module of the sixth aspect, the first board may have an avoidance portion that prevents interference between the through screw and the first board.

Also, according to an eighth aspect of the present invention, in the wireless module of any one of the first to seventh aspects, the second board may have a first fixing hole that fixes the second board to at least one of the case and the cover, at least one of the case and the cover may have a second fixing hole through which a fixing screw inserted into the first fixing hole is inserted, and at least one of the first fixing hole and the second fixing hole may have a long hole shape.

Also, according to a ninth aspect of the present invention, in the wireless module of the eighth aspect, the second fixing hole may be provided in the case.

Also, according to a tenth aspect of the present invention, in the wireless module of any one of the first to ninth aspects, the second board may have a first fixing hole that fixes the second board to at least one of the case and the cover, and a through hole tap may be provided in the first fixing hole.

Also, according to an eleventh aspect of the present invention, in the wireless module of any one of the first to tenth aspects, an external terminal may be provided on the second board, among components provided on the first board or the second board, components other than the antenna and the external terminal may be located between the case and the cover in a facing direction in which the case and the cover face each other, and among the components provided on the first board or the second board, the components other than the antenna and the external terminal may overlap both the case and the cover when seen in the facing direction.

Also, according to a twelfth aspect of the present invention, in the wireless module of any one of the first to eleventh aspects, the cover and the case may be made of a metal.

Also, according to a thirteenth aspect of the present invention, in the wireless module of the twelfth aspect, a power feeding element that supplies a high frequency signal to the antenna may be mounted on the first board, and the power feeding element may be surrounded by the case and a GND of the first board.

Also, according to a fourteenth aspect of the present invention, in the wireless module of the twelfth or thirteenth aspect, a metal portion may be exposed on at least a portion of a surface of the first board, and the metal portion may be in electrical contact with the case.

Also, according to a fifteenth aspect of the present invention, in the wireless module of the fourteenth aspect, the metal portion may be a GND layer of the first board.

According to the above aspects of the present invention, it is possible to provide a wireless module capable of curbing deterioration of wireless performance caused by positional deviation between the antenna and the housing.

DETAILED DESCRIPTION OF THE INVENTION

Hereinafter, a wireless module according to an embodiment of the present invention will be described on the basis of the drawings.

Figure 1:
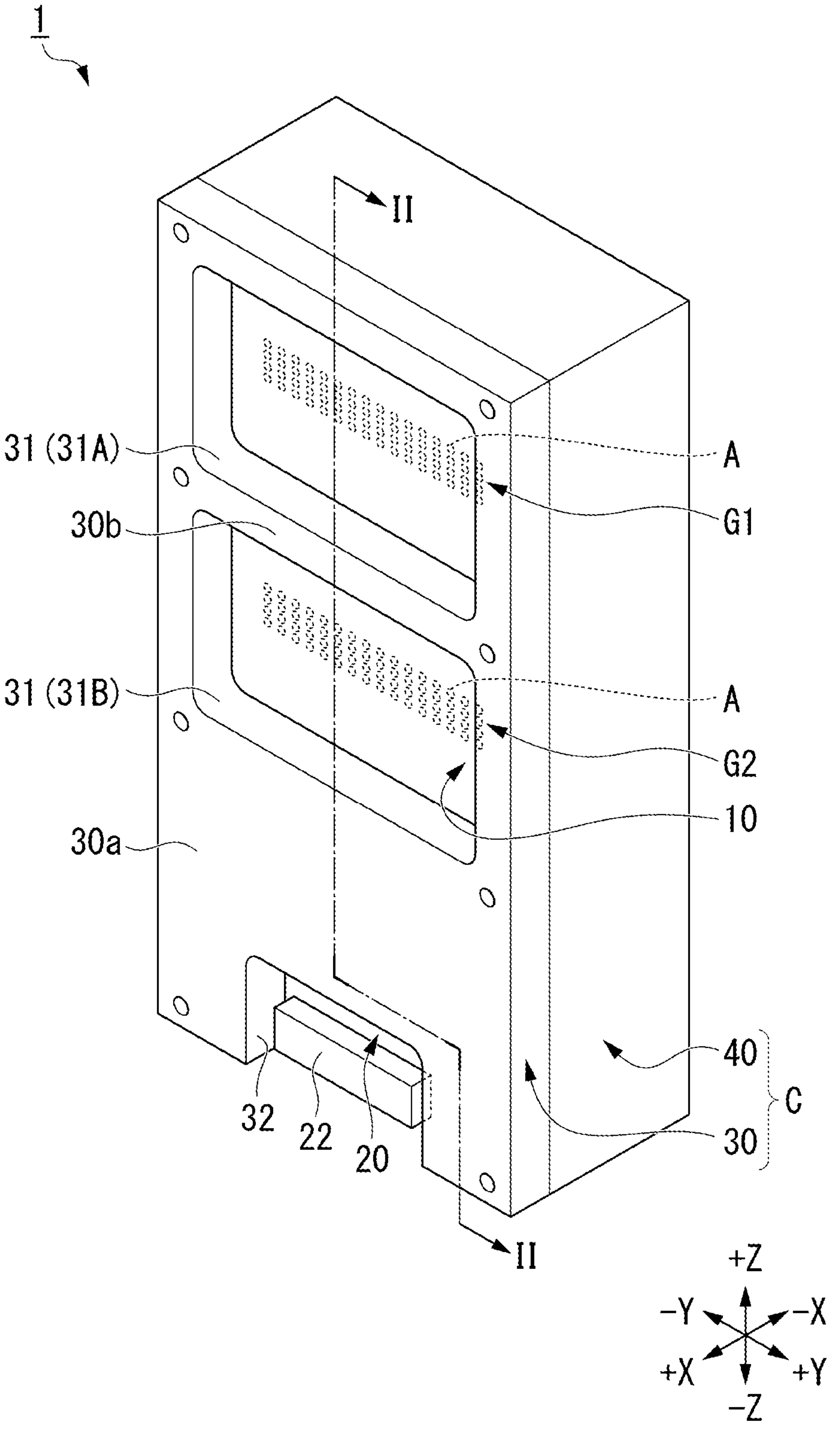
FIG. 1 is a perspective view showing a wireless module according to an embodiment of the present invention.
Figure 2:
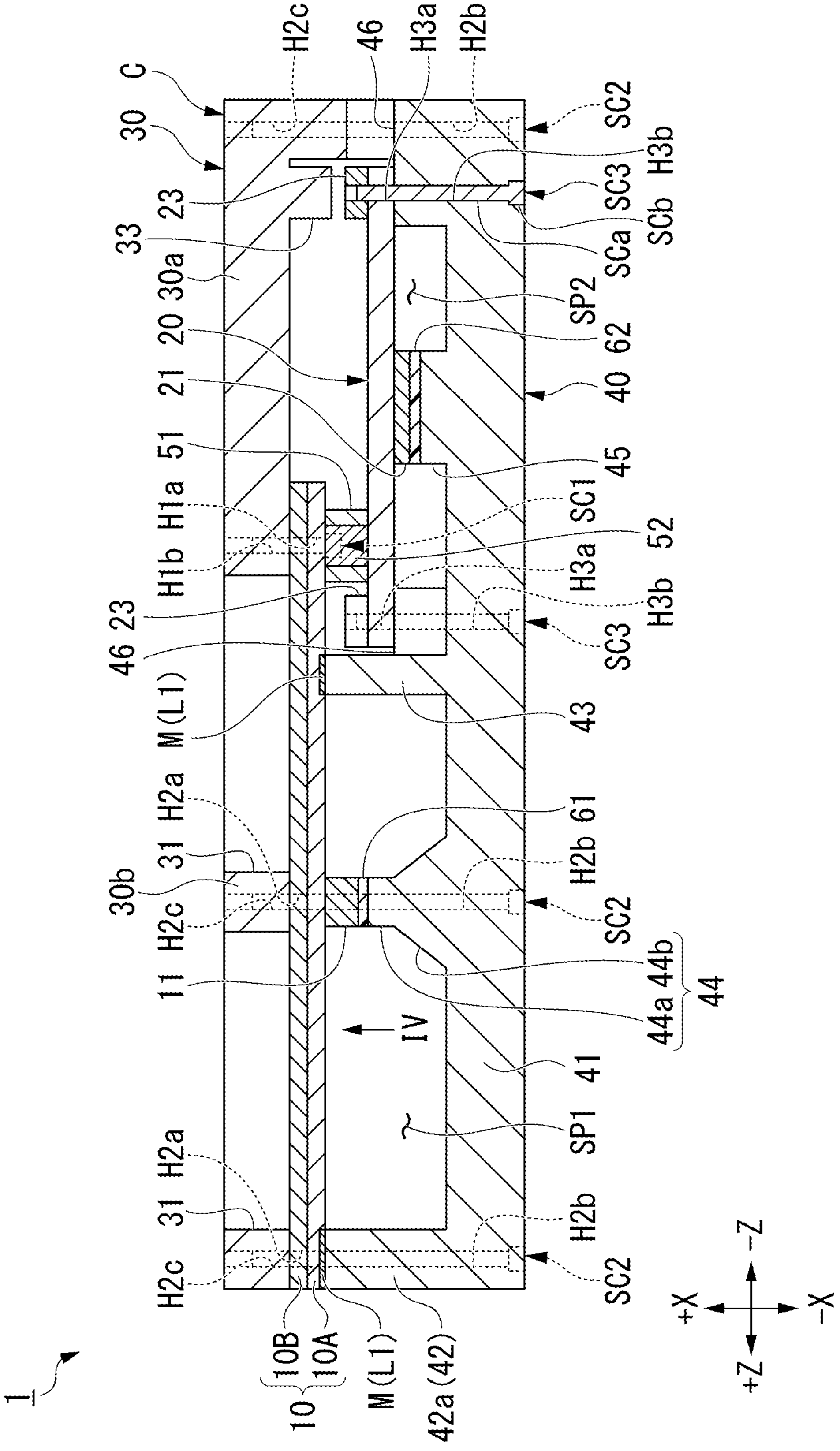
FIG. 2 is a cross-sectional view taken along line 11-11 shown in FIG. 1.

As shown in FIGS. 1 and 2, a wireless module 1 according to this embodiment includes a first board 10, a second board 20, and a housing C. The housing C includes a cover 30 and a case 40. The cover 30 and the case 40 are combined with each other in a thickness direction of the housing C. The housing C accommodates the first board 10 and the second board 20. The housing C according to this embodiment has a substantially rectangular exterior in plan view seen in the thickness direction of the housing C. The housing C (the cover 30 and the case 40) is made of a metal such as aluminum, stainless steel, or the like. The first board 10 has a plurality of antennas A. Each of the antennas A transmits and receives a high frequency signal (an RF signal) in a millimeter wave band.

(Direction Definition)

Here, in this embodiment, a direction in which the cover 30 and the case 40 face each other is referred to as a facing direction X. In this embodiment, the facing direction X is also the thickness direction of the housing C. Hereinafter, viewing in the facing direction X will be referred to as plan view. One direction that intersects (for example, is orthogonal to) the facing direction X is referred to as a first direction Y. In this embodiment, the first direction Y is also a direction in which a short side of the housing C extends in plan view. A direction that intersects (for example, is orthogonal to) both the facing direction X and the first direction Y is referred to as a second direction Z. In this embodiment, the second direction Z is also a direction in which a long side of the housing C extends in plan view. Further, a direction from the case 40 toward the cover 30 in the facing direction X is referred to as the front surface side, and is represented by a +X direction in the drawing. A direction from the cover 30 toward the case 40 in the facing direction X is referred to as the back surface side, and is represented by a −X direction in the drawing. One direction in the first direction Y is referred to as rightward, and is represented by a +Y direction in the drawing. A direction opposite to the +Y direction is referred to as leftward, and is represented by a −Y direction in the drawing. One direction in the second direction Z is referred to as upward, and is represented by a +Z direction in the drawing. A direction opposite to the +Z direction is referred to as downward, and is represented by a −Z direction in the drawing.

As shown in FIG. 1, the cover 30 according to this embodiment has a plate portion 30*a*, a beam portion 30*b*, two passage portions 31, and a terminal hole 32. The plate portion 30*a* has a plate-like shape extending in the first direction Y and the second direction Z.

The passage portion 31 is a portion through which electromagnetic waves transmitted and received by the antenna A pass. In other words, the passage portion 31 is a portion that prevents electromagnetic waves from electromagnetically interfering with the cover 30 (the plate portion 30*a*). As shown in FIGS. 1 and 2, the passage portion 31 according to this embodiment is a hole (an opening) that passes through the plate portion 30*a* in the facing direction X. In this embodiment, the two passage portions 31 are disposed with an interval therebetween in the second direction Z. Hereinafter, the two passage portions 31 will be referred to as a first passage portion 31A and a second passage portion 31B, respectively. The first passage portion 31A is located above the second passage portion 31B.

As shown in FIG. 1, positions of the two passage portions 31 correspond to positions of two antenna groups G1 and G2 (described below) included in the first board 10. That is, a position of the first passage portion 31A corresponds to a position of the first antenna group G1, and a position of the second passage portion 31B corresponds to a position of the second antenna group G2.

The beam portion 30*b* is a portion of the cover 30 located between the two passage portions 31. The beam portion 30*b* according to this embodiment extends linearly in the first direction Y. The beam portion 30*b* separates the two passage portions 31 in the second direction Z.

In this embodiment, the terminal hole 32 is provided at a lower end portion of the cover 30 (the plate portion 30*a*). The terminal hole 32 passes through the plate portion 30*a* in the facing direction X and opens downward. A position of the terminal hole 32 corresponds to a position of an external terminal 22 (described below) provided on the second board 20.

Figure 3:
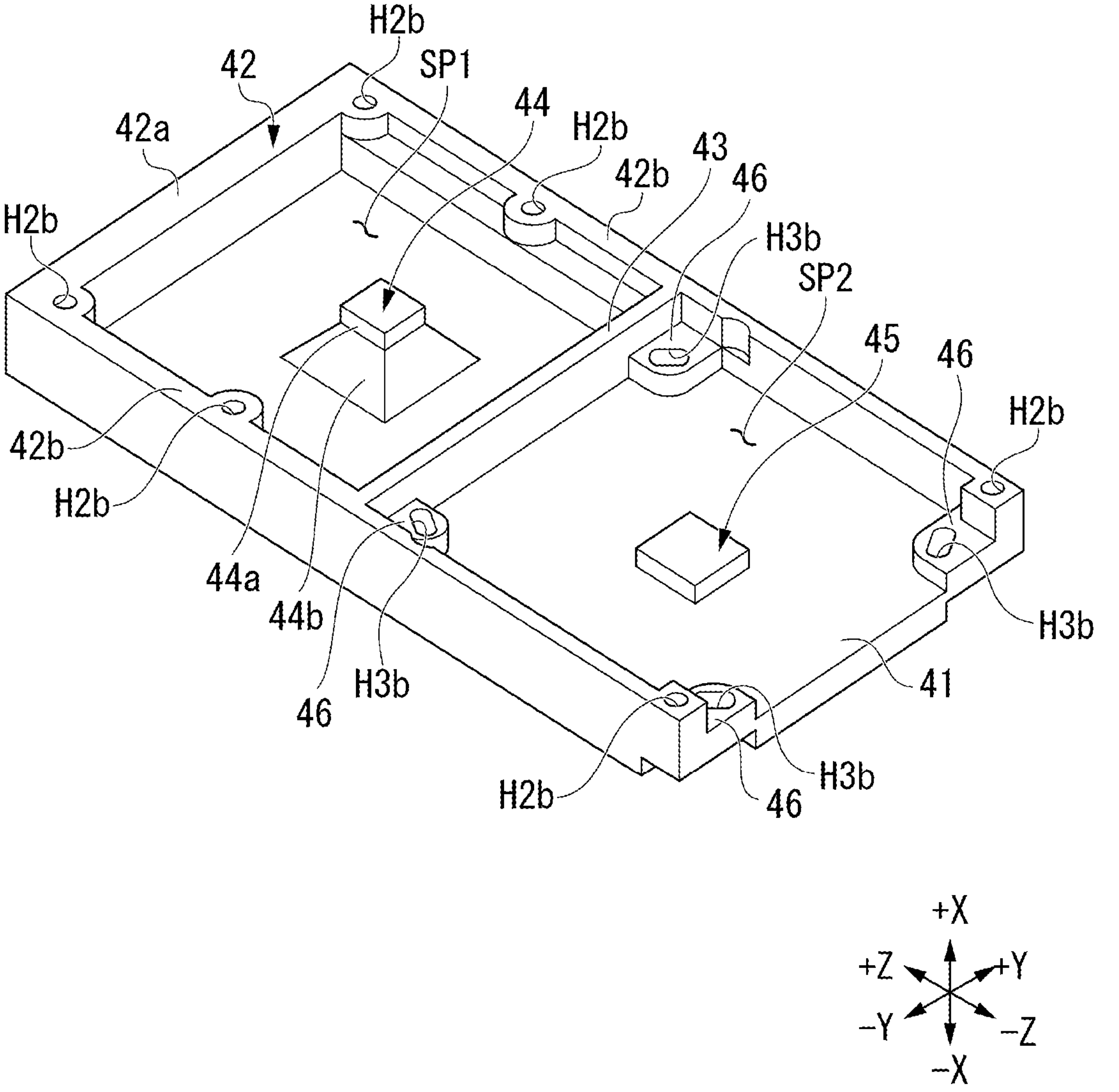
FIG. 3 is a perspective view showing a case according to an embodiment of the present invention.

As shown in FIGS. 2 and 3, the case 40 according to this embodiment has a base portion 41, a peripheral wall portion 42, a partition portion 43, a first heat dissipation portion 44, a second heat dissipation portion 45, and a plurality of (four in the illustrated example) pedestal portions 46. As shown in FIG. 3, the base portion 41 has a plate-like shape extending in the first direction Y and the second direction Z.

The peripheral wall portion 42 extends from an outer peripheral edge of the base portion 41 toward the front surface side (the +X side). In other words, the peripheral wall portion 42 stands upright on the outer peripheral edge of the base portion 41. The peripheral wall portion 42 according to this embodiment has a U shape that is convex toward the upper side (the +Z side) in plan view. Specifically, the peripheral wall portion 42 according to this embodiment includes a top portion 42*a* and a pair of side portions 42*b*. The top portion 42*a* extends along a short side of the base portion 41 on the upper side (the +Z side). Each of the side portions 42*b* extends along a long side of the base portion 41.

The partition portion 43 stands upright at a center portion of the base portion 41. Furthermore, the partition portion 43 extends in the first direction Y and connects center portions of the pair of side portions 42*b*. Thus, the partition portion 43 partitions a space surrounded by the base portion 41 and the peripheral wall portion 42 into an upper space SP1 and a lower space SP2. The upper space SP1 is a space located above (on the +Z side of) the partition portion 43. The upper space SP1 is surrounded by the top portion 42*a*, the pair of side portions 42*b*, and the partition portion 43. The lower space SP2 is a space located below (on the −Z side of) the partition portion 43. The lower space SP2 is surrounded by the pair of side portions 42*b* and the partition portion 43.

As shown in FIG. 3, the first heat dissipation portion 44 is located at a center portion of the upper space SP1 in plan view. The first heat dissipation portion 44 has a shape that protrudes from the base portion 41 toward the front surface side (the +X side). Specifically, the first heat dissipation portion 44 according to this embodiment includes a contact portion 44*a* and a taper portion 44*b*. The taper portion 44*b* is provided on an end surface of the base portion 41 on the front surface side (a surface on the +X side). The taper portion 44*b* has a tapered shape in which a cross-sectional area gradually decreases in a direction from the back surface side (the −X side) to the front surface side (the +X side). The contact portion 44*a* is provided at a tip end portion of the taper portion 44*b*. As shown in FIG. 2, a first heat dissipation sheet 61 is in contact with a tip end surface of the contact portion 44*a*.

As shown in FIG. 3, the second heat dissipation portion 45 is located at a center portion of the lower space SP2 in plan view. The second heat dissipation portion 45 has a shape that protrudes from the base portion 41 toward the front surface side (the +X side). In this embodiment, as shown in FIG. 2, the amount of protrusion by which the second heat dissipation portion 45 protrudes from the base portion 41 is smaller than the amount of protrusion by which the first heat dissipation portion 44 protrudes from the base portion 41. In other words, in the facing direction X, a distance between a tip end surface (an end surface on the front surface side, a surface on the +X side) of the second heat dissipation portion 45 and the base portion 41 is shorter than the distance between a tip end surface (an end surface on the front surface side, a surface on the +X side) of the first heat dissipating portion 44 and the base portion 41. As shown in FIG. 2, a second heat dissipation sheet 62 is in contact with a tip end surface of the second heat dissipation portion 45.

As shown in FIG. 3, the four pedestal portions 46 are located at four corners of the lower space SP2 in plan view. Each of the pedestal portions 46 has a shape that protrudes from the base portion 41 toward the front surface side (the +X side). The amount of protrusion by which the pedestal portion 46 protrudes from the base portion 41 is smaller than the amount of protrusion by which the peripheral wall portion 42 protrudes from the base portion 41. In other words, in the facing direction X, a distance between a tip end surface (an end surface on the front surface side, a surface on the +X side) of the pedestal portion 46 and the base portion 41 is shorter than a distance between a tip end surface (an end surface on the front surface side, a surface on the +X side) of the peripheral wall portion 42 and the base portion 41. As shown in FIG. 2, the second board 20 is in contact with the tip end surface of the pedestal portion 46.

Figure 4:
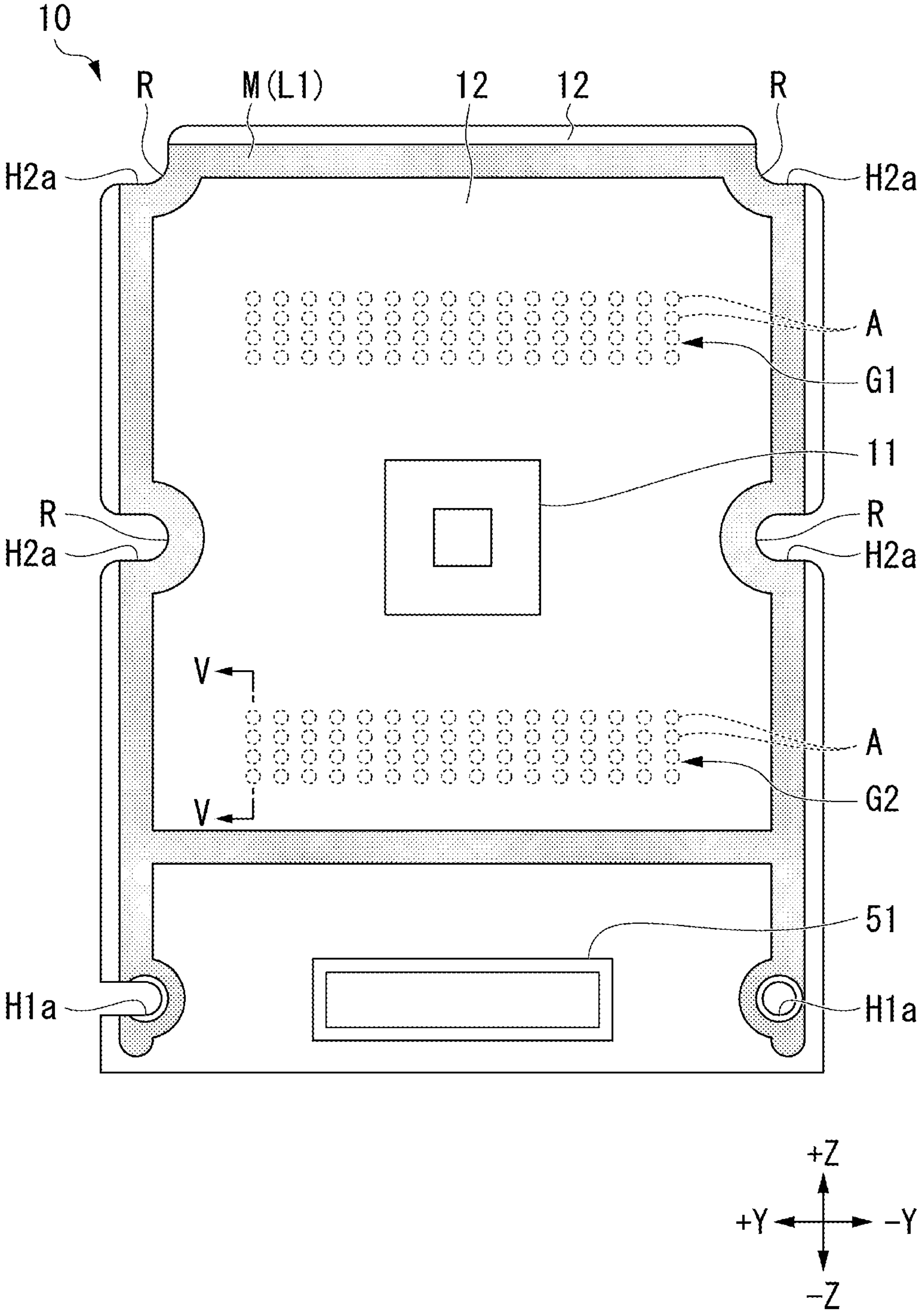
FIG. 4 is a diagram of a first board shown in FIG. 2 when seen from arrow IV.

As shown in FIG. 4, a first power feeding element 11 is mounted on the first board 10. In this embodiment, the plurality of antennas A constitute two antenna groups including a first antenna group G1 and a second antenna group G2. The first antenna group G1 and the second antenna group G2 are disposed so as to sandwich the first power feeding element 11 therebetween in the second direction Z.

Each of the antennas A belonging to the first antenna group G1 is, for example, a transmitting antenna that transmits electromagnetic waves to the outside of the wireless module 1. Each of the antennas A belonging to the second antenna group G2 is, for example, a receiving antenna that receives electromagnetic waves from the outside of the wireless module 1. Note that, the arrangement and function of each of the antennas A may be changed as appropriate. For example, each of the antennas A belonging to the first antenna group G1 may be a receiving antenna, and each of the antennas A belonging to the second antenna group G2 may be a transmitting antenna. Moreover, the wireless module 1 may have one or three or more antenna groups.

The first power feeding element 11 supplies each of the antennas A with a high frequency signal (an RF signal). Specifically, the first power feeding element 11 supplies a high frequency signal (an RF signal) to each of the antennas A through a signal layer L1 or the like. which will be described below. As the first power feeding element 11, for example, it is possible to use a radio frequency integrated circuit (RFIC) or the like. The first board 10 is also called an RFIC board or an RF board. Although detailed illustrations are omitted, peripheral components other than the first power feeding element 11 and the antennas A may be mounted on the first board 10.

Figure 5:
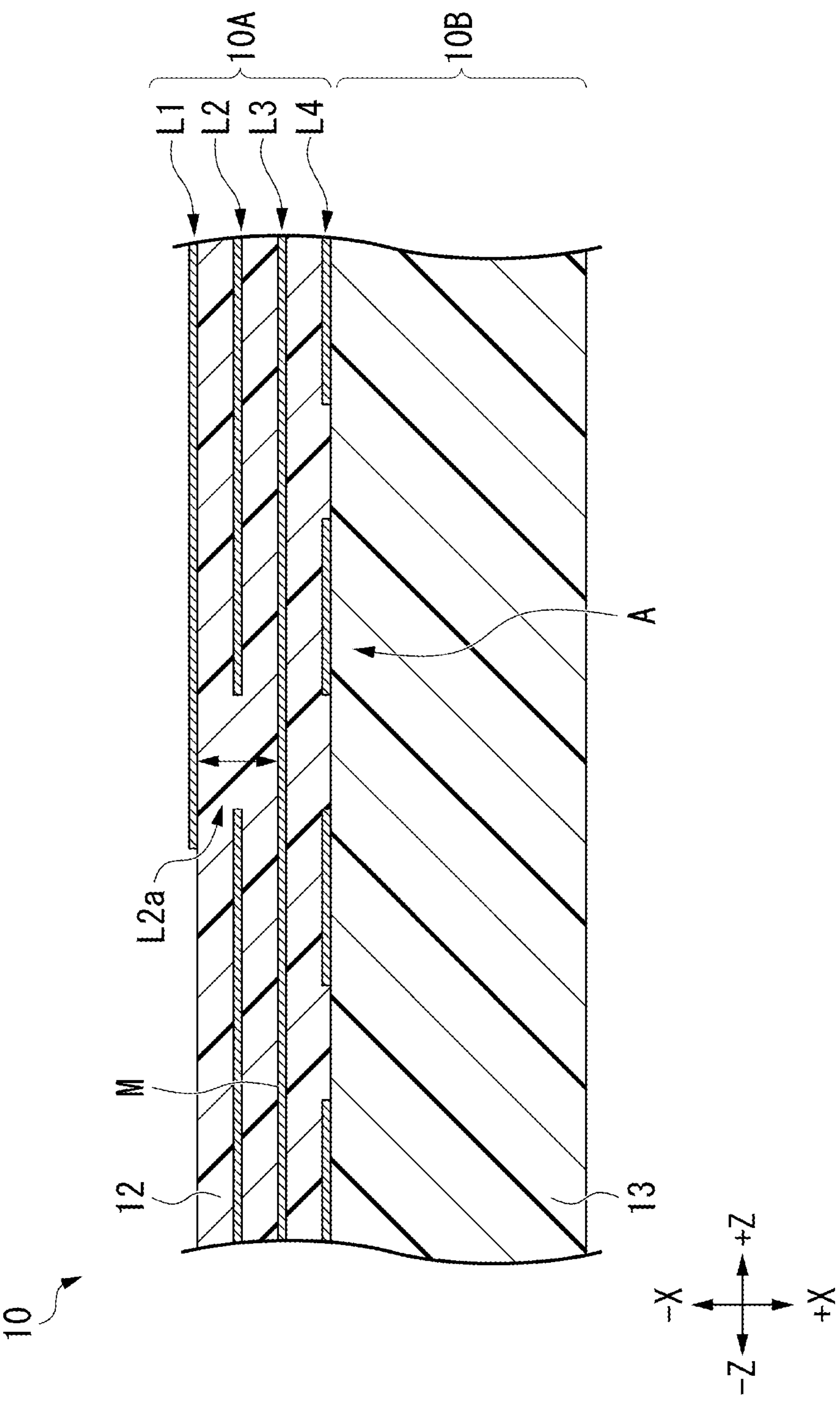
FIG. 5 is a cross-sectional view taken along line V-V shown in FIG. 4.

As shown in FIGS. 2 and 5, the first board 10 according to this embodiment has a structure in which a main portion 10A and a reinforcing portion 10B are stacked in the facing direction X. As shown in FIGS. 2 and 5, the reinforcing portion 10B is stacked on the front surface side (the +X side) of the main portion 10A. The first power feeding element 11 described above is mounted on the main portion 10A, as shown in FIG. 2.

As shown in FIG. 5, the main portion 10A according to this embodiment is a multilayer board having four layers L1 to L4 disposed at intervals in the facing direction X. An insulator 12 is filled between the four layers L1 to L4. The main portion 10A is, for example, a liquid crystal polymer (LCP) board.

Specifically, the main portion 10A includes a signal layer L1, a GND layer L2, a first antenna layer L3, and a second antenna layer L4. The signal layer L1, the GND layer L2, the first antenna layer L3, and the second antenna layer L4 are disposed in this order in a direction from the back surface side (the −X side) to the front surface side (the +X side). The second antenna layer L4 is in contact with the reinforcing portion 10B. A layered metal portion (a conductor portion) M is disposed in each of the layers L1 to L4.

The plurality of antennas A are disposed at intervals in the first direction Y and the second direction Z in the first antenna layer L3 and the second antenna layer L4. Specifically, the metal portion M (a radiation element) disposed on the first antenna layer L3 and the metal portion M (a parasitic element) disposed on the second antenna layer L4 constitute the plurality of antennas A. The signal layer L1 is electrically connected to the first power feeding element 11, and exchanges a high frequency signal (an RF signal) with the first power feeding element 11 when the antenna A transmits and receives electromagnetic waves. Here, the signal layer L1 and the first antenna layer L3 according to this embodiment are electromagnetically coupled (for example, capacitively coupled) via an opening L2*a* provided in the GND layer L2. Due to the electromagnetic coupling, it is possible for each of the antennas A to transmit electromagnetic waves by means of the high frequency signal output from the first power feeding element 11 and to output received electromagnetic waves to the first power feeding element 11.

The reinforcing portion 10B reinforces the main portion 10A and protects the antennas A. The reinforcing portion 101 according to this embodiment is a thin plate-like member formed of a low-loss dielectric 13. The material of the low-loss dielectric 13 and the dimension (a thickness) of the reinforcing portion 10B are preferably selected so as not to adversely affect transmission and reception of electromagnetic waves by the antenna A. The reinforcing portion 10B may have a role of improving a gain of electromagnetic waves.

The first board 10 extends in the first direction Y and the second direction Z. Further, the first board 10 according to this embodiment is fixed to the housing C so as to be sandwiched between the cover 30 and the case 40 in the facing direction X, as shown in FIG. 2. More specifically, the first board 10 according to this embodiment is sandwiched between the cover 30, and the peripheral wall portion 42 and the partition portion 43 of the case 40 in the facing direction X. Thus, the first board 10 closes the upper space SP1 of the case 40.

The metal portion M is exposed on at least a portion of a surface of the first board 10 (the main portion 10A). In this embodiment, the metal portion M is exposed on a portion of the first board 10 that is in contact with the case 40 (the peripheral wall portion 42 and the partition portion 43). Thus, the metal portion M of the first board 10 is in mechanical and electrical contact with the case 40. Specifically, as shown in FIGS. 2 and 4, the metal portion M is exposed on portions of the first board 10 that are in contact with the top portion 42*a*, the side portion 42*b*, and the partition portion 43. The metal portion M exposed on the surface of the first board 10 and in contact with the case 40 is, for example, GND (so-called solid pattern, solid GND) of the signal layer L1 (refer to FIG. 5). In FIG. 2, for ease of viewing, configurations of the layers L1 to L4 other than the above-described contact portions are not illustrated. However, the GND (the solid GND) of the layers L2 to L4 may be exposed on the surface of the first board 10 and may be in contact with the case 40. In this case, the insulator 12 may be appropriately removed from the surface of the first board 10.

The first power feeding element 11 according to this embodiment is surrounded by the case 40 and the GND (the solid GND) of the first board 10. Specifically, in the facing direction X, the first power feeding element 11 is located between the base portion 41 of the case 40 and the GND of the first board 10. Further, in the first direction Y, the first power feeding element 11 is located between a pair of side portions 42*b* of the case 40 (refer to FIG. 3). Further, in the second direction Z, the first power feeding element 11 is located between the top portion 42*a* and the partition portion 43 of the case 40 (refer to FIG. 2). In this way, the first power feeding element 11 is surrounded by the case 40 and the GND of the first board 10 in three directions including the facing direction X, the first direction Y, and the second direction Z. Note that, the GND of the first board 10 surrounding the first power feeding element 11 together with the case 40 may be the GND of the signal layer L1, the GND of the GND layer L2, the GND of the first antenna layer L3, the GND of the second antenna layer L4, or a combination thereof.

As shown in FIGS. 2 and 4, the first board 10 includes a first connector 51. In other words, the first connector 51 is mounted on the first board 10. The first connector 51 is provided at a lower end portion (a −Z end portion) of the first board 10. As shown in FIG. 2, the first connector 51 extends from the lower end portion (the −Z end portion) of the first board 10 toward the back surface side (the −X side). The second board 20 includes a second connector 52. In other words, the second connector 52 is mounted on the second board 20. As shown in FIG. 2, the second connector 52 extends from an upper end portion (a +Z end portion) of the second board 20 toward the front surface side (the +X side).

The first connector 51 and the second connector 52 are inter-board connectors that electrically connect the first board 10 to the second board 20. Specifically, the first board 10 and the second board 20 are electrically connected by directly electrically connecting the first connector 51 and the second connector 52. In other words, the first board 10 and the second board 20 are electrically connected by mechanically and electrically connecting the first connector 51 and the second connector 52. In a state in which the first board 10 and the second board 20 are electrically connected, the first connector 51 and the second connector 52 are located in the lower space SP2 described above. The first connector 51 may be a male connector and the second connector 52 may be a female connector, or the first connector 51 may be a female connector and the second connector 52 may be a male connector.

The second board 20 is a board that handles a baseband signal of a lower frequency than the high frequency signal transmitted and received by the antenna A of the first board 10. The second board 20 is also called a baseband board or a BB board. The second board 20 is, for example, a glass epoxy board.

As shown in FIG. 2, the second board 20 is electrically connected to the first board 10 via the first connector 51 and the second connector 52. The second board 20 extends in the first direction Y and the second direction Z. In the facing direction X, the second board 20 and the first board 10 are disposed at different positions. Specifically, in the facing direction X, a distance between the second board 20 and the base portion 41 is shorter than a distance between the first board 10 and the base portion 41. Further, in plan view, the first board 10 and the second board 20 at least partially overlap. More specifically, in the illustrated example, a lower end portion (a −Z end portion) of the first board 10 and an upper end portion (a +Z end portion) of the second board 20 overlap in plan view. The first connector 51 and the second connector 52 are provided at a portion at which the two boards 10 and 20 overlap as described above.

As shown in FIGS. 1 and 2, a second power feeding element 21 and an external terminal 22 are provided on the second board 20 according to this embodiment. The external terminal 22 is, for example, a terminal for supplying power to the first board 10 and the second board 20. As shown in FIG. 1, the external terminal 22 is exposed to the outside of the housing C through the terminal hole 32 of the cover 30.

The second power feeding element 21 supplies a baseband signal (a BB signal) to the first power feeding element 11 via the first connector 51 and the second connector 52 (refer to FIG. 2). As the second power feeding element 21, for example, it is possible to use a base band integrated circuit (BBIC) or the like. Although detailed illustrations are omitted, peripheral components other than the second power feeding element 21 and the external terminal 22 may be mounted on the second board 20.

As shown in FIG. 2, the first heat dissipation sheet 61 is in contact with both the first power feeding element 11 and the first heat dissipation portion 44 (the contact portion 44*a*). The first heat dissipation sheet 61 absorbs heat from the first power feeding element 11 and releases the absorbed heat to the first heat dissipation portion 44.

As shown in FIG. 2, the second heat dissipation sheet 62 is in contact with both the second power feeding element 21 and the second heat dissipation portion 45. The second heat dissipation sheet 62 absorbs heat from the second power feeding element 21 and releases the absorbed heat to the second heat dissipation portion 45.

The first board 10, the second board 20, the cover 30, and the case 40 described above are fixed to each other by positioning screws SC1, through screws SC2, and fixing screws SC3, as shown in FIG. 2. Each of the screws SC1 to SC3 has a screwing portion SCa and a head portion SCb fixed to one end of the screwing portion SCa. A spiral protrusion is formed on an outer peripheral surface of the screwing portion SCa. The head portion SCb has a larger diameter than the screwing portion SCa. A fixing structure using the screws SC1 to SC3 will be described below.

The positioning screw SC1 positions and fixes the first board 10 with respect to the cover 30. As shown in FIG. 4, the first board 10 according to this embodiment has a plurality of (two in the illustrated example) positioning holes H1*a*. In this embodiment, each of the positioning holes H1*a* is located in an outer peripheral portion of the first board 10 in plan view. The positioning hole H1*a* is a hole for positioning and fixing the first board 10 with respect to the cover 30. Each of the positioning holes H1*a* passes through the first board 10 in the facing direction X. The positioning screw SC1 is inserted through each of the positioning holes H1*a*. In this embodiment, two positioning holes H1*a* are provided near the first connector 51. Further, one of the two positioning holes H1*a* is open at the outer peripheral edge of the first board 10.

As shown in FIG. 2, the cover 30 has a first screw hole H1*b* into which the positioning screw SC1 is inserted. Although detailed illustrations are omitted, the cover 30 has the same number of first screw holes H1*b* as that of the positioning holes H1*a*. Positions of the first screw holes H1*b* correspond to positions of the positioning holes H1*a*. A spiral groove that is threadedly engaged with the outer peripheral surface of the screwing portion SCa is provided in the inner peripheral surface of the first screw hole H1*b*.

When the first board 10 is positioned and fixed to the cover 30, the screwing portion SCa of the positioning screw SC1 is screwed into the first screw hole H1*b* while being inserted through the positioning hole H1*a*. Then, the head portion SCb of the positioning screw SC1 eventually comes into contact with the first board 10. When the positioning screw SC1 is screwed further, the head portion SCb presses the first board 10 toward the cover 30. Due to the pressing force, the first board 10 is fixed to the cover 30 while being in contact with the cover 30. More specifically, the first board 10 according to this embodiment is fixed to the cover 30 while being in surface contact with the cover 30. Further, the first board 10 according to this embodiment is not fixed to the case 40 with screws.

The through screw SC2 fixes the case 40 to the cover 30. As shown in FIG. 3, the case 40 according to this embodiment has a plurality of (six in the illustrated example) through holes H2*b*. Each of the through holes H2*b* passes through the case 40 in the facing direction X. The through screw SC2 is inserted through each of the through holes H2*b*. In this embodiment, each of the through holes H2*b* is provided in the peripheral wall portion 42 of the case 40.

Further, as shown in FIG. 2, the cover 30 has a second screw hole H2*c* into which the through screw SC2 is inserted. Although detailed illustrations are omitted, the cover 30 has the same number of second screw holes H2*c* as that of the through holes H2*b*. Positions of the second screw holes H2*c* correspond to positions of the through holes H2*b*. A spiral groove that is threadedly engaged with the outer peripheral surface of the screwing portion SCa is provided in the inner peripheral surface of the second screw hole H2*c*.

Here, as described above, the first board 10 according to this embodiment is sandwiched between the cover 30 and the peripheral wall portion 42 of the case 40 in the facing direction X. In this embodiment, since the through hole H2*b* is provided in the peripheral wall portion 42, the through screw SC2 passes through not only the cover 30 and the case 40 but also the first board 10.

The first board 10 has avoidance portions H2*a*, as shown in FIG. 4. The avoidance portions H2*a* are holes for preventing interference (structural interference) between the through screw SC2 and the first board 10. Positions of the avoidance portion H2*a* correspond to the positions of the through holes H2*b* and the second screw holes H2*c*. Each of the avoidance portions H2*a* passes through the first board 10 in the facing direction X. In this embodiment, each of the avoidance portions H2*a* opens at the outer peripheral edge of the first board 10. Further, the size (the area in plan view) of each of the avoidance portions H2*a* is larger than the size of the positioning hole H1*a*. More specifically, each of the avoidance portions H2*a* has a circular arc R with a radius of curvature larger than that of the positioning hole H1*a* in plan view.

When the case 40 is fixed to the cover 30, the screwing portion SCa of the through screw SC2 is screwed into the second screw hole H2*c* while being inserted through the through hole H2*b*. Then, the head portion SCb of the through screw SC2 eventually comes into contact with the case 40. When the through screw SC2 is further screwed, the head portion SCb presses the case 40 and the first board 10 toward the cover 30. The case 40 is fixed to the cover 30 by the pressing force. Further, since the case 40 presses the first board 10 against the cover 30, the first board 10 is more firmly fixed to the cover 30. That is, the through screw SC2 also has the role of making the first board 10 more firmly fixed to the cover 30.

The fixing screw SC3 fixes the second board 20 to the case 40. As shown in FIG. 3, the case 40 according to this embodiment has a plurality of (four in the illustrated example) second fixing holes H3*b*. Each of the second fixing holes H3*b* passes through the case 40 in the facing direction X. The fixing screw SC3 is inserted through each of the second fixing holes H3*b*. In this embodiment, four second fixing holes H3*b* and four pedestal portions 46 correspond one-to-one, and one second fixing hole H3*b* opens in each of the pedestal portions 46. As shown in FIG. 3, each of the second fixing holes H3*b* has a long hole shape.

As shown in FIG. 2, the second board 20 has a first fixing hole H3*a* into which a fixing screw SC3 is inserted. Although detailed illustrations are omitted, the second board 20 has the same number of first fixing holes H3*a* as that of the second fixing holes H3*b*. Positions of the first fixing holes H3*a* correspond to positions of the second fixing holes H3*b*. A through hole tap 23 is disposed in each of the first fixing holes H3*a*. The through hole tap 23 is a tubular member fixed to the first fixing hole H3*a*. A spiral groove that is threadedly engaged with the outer peripheral surface of the screwing portion SCa is provided in the inner peripheral surface of the through hole tap 23.

When the second board 20 is fixed to the case 40, the screwing portion SCa of the fixing screw SC3 is screwed into the through hole tap 23 while being inserted through the second fixing hole H3*b*. Then, the head portion SCb of the fixing screw SC3 eventually comes into contact with the case 40. When the fixing screw SC3 is further screwed, the head portion SCb presses the second board 20 toward the case 40 via the through hole tap 23. The second board 20 is fixed to the case 40 by a pressing force.

In the state in which the first board 10, the second board 20, the cover 30, and the case 40 are fixed to each other as described above, among components provided on the first board 10 or the second board 20, the components other than the antenna A and the external terminal 22 are covered by the housing C when seen in the facing direction X. That is, among the components provided on the first board 10 or the second board 20, the components other than the antenna A and the external terminal 22 are located between the case 40 and the cover 30 in the facing direction X and also overlap both the case 40 and the cover 30 when seen in the facing direction X. This configuration may make modification of the wireless module 1 difficult. Modification of the wireless module 1 may be made more difficult by using security screws as the screws SC1 to SC3. Note that, examples of "the components other than the antenna A and the external terminal 22 among the components provided on the first board 10 or the second board 20" include the first power feeding element 11, the second power feeding element 21, and peripheral components (a power IC, a memory, a crystal oscillator, and the like) mounted on the boards 10 and 20.

Figure 6:
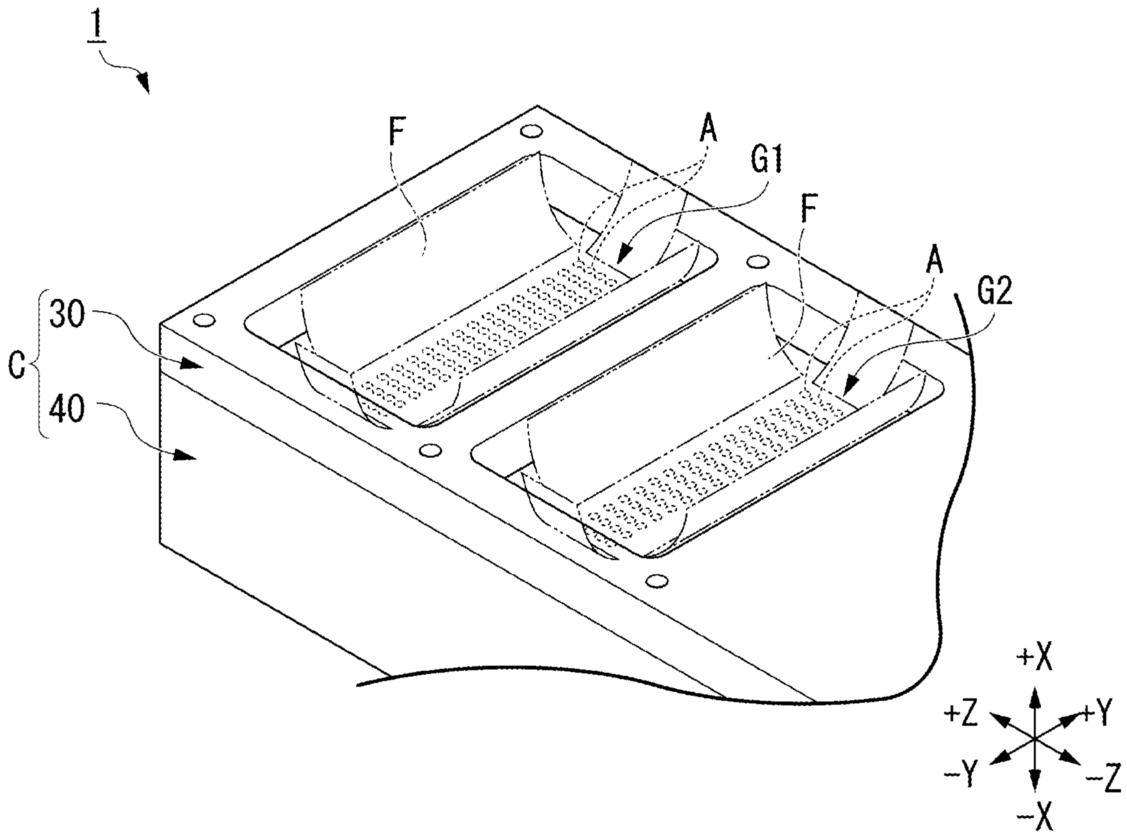
FIG. 6 is a diagram showing a preferable positional relationship between an antenna and a passage portion.

Next, a preferable positional relationship between the passage portion 31 and the antenna A will be described on the basis of FIGS. 6 and 7.

As described above, the passage portion 31 is a portion that prevents electromagnetic waves from electromagnetically interfering with the cover 30. Here, in order to curb electromagnetic interference between the electromagnetic waves transmitted and received by the antenna A and the cover 30 and to more reliably curb deterioration of wireless performance of the wireless module 1, it is preferable that the antenna A and the passage portion 31 have a positional relationship as shown in FIG. 6. That is, the passage portion 31 is preferably provided so that a Fresnel zone F of the antenna A and the cover 30 do not interfere with each other.

The Fresnel zone F is defined as a region in which a path difference is less than or equal to half a wavelength (a region in which a phase difference is less than or equal to 180°) when electromagnetic waves propagate from a transmission point to a reception point. FIG. 7 is a graph depicting the Fresnel zone F on two-dimensional plane coordinates. In FIG. 7, antennas A1 to A3 correspond to the antenna A included in the wireless module 1. Antennas A1' to A3' correspond to the antenna A' that are disposed outside the wireless module 1 and transmits and receives electromagnetic waves to and from the antenna A of the wireless module 1. The Fresnel zone F is calculated for each set of the antenna A and the antenna A'. For example, a Fresnel zone F1 shown in FIG. 7 is a Fresnel zone F calculated by a set of the antenna A1 and the antenna A1', and a Fresnel zone F2 is a Fresnel zone F calculated by a set of the antenna A2 and the antenna A2'. A Fresnel zone F3 is a Fresnel zone F calculated by a set of the antenna A3 and the antenna A3'.

Figure 7:
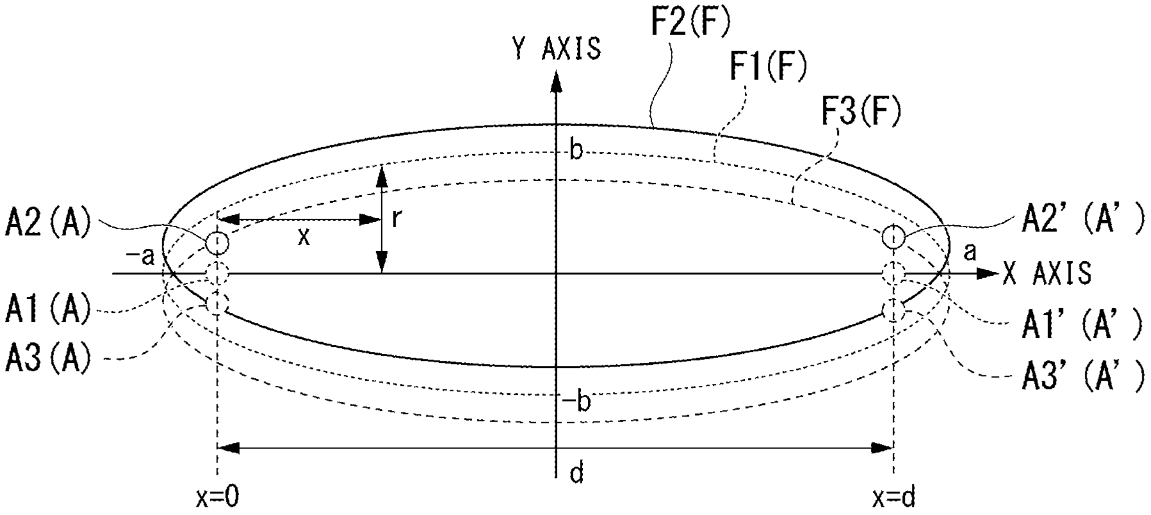
FIG. 7 is a diagram illustrating a Fresnel zone.

An X axis in FIG. 7 corresponds to the facing direction X of the wireless module 1. A Y axis corresponds to a direction orthogonal to the facing direction X (for example, the first direction Y and the second direction Z of the wireless module 1). That is, it is assumed that the wireless module 1 transmits electromagnetic waves toward the front surface side (the +X side) and receives electromagnetic waves from the front surface side (the +X side). Each value shown in FIG. 7 is defined as follows.

- d: Distance between transmitting point and receiving point (distance between transmitting and receiving points) [m]
- a: Major axis of ellipse [m]
- b: Minor axis of ellipse [m]
- x: Coordinates based on transmitting point (location coordinates between transmission points) [m]
- r: Fresnel radius [m]

Relationships shown in the following Equations (1) to (3) are established for each of the above values. Note that, λ[m] is a wavelength of electromagnetic waves transmitted and received by the antennas A and A'.

[Equation 1]

$$r = b\sqrt{1-\left(\frac{x}{a}\right)^2} \tag{1}$$

$$a = \frac{1}{2}d + \frac{1}{2}\lambda \tag{2}$$

$$b = \frac{1}{2}\sqrt{\frac{1}{4}\lambda + \lambda d} \tag{3}$$

Here, the distance d between the transmitting and receiving points is a value that varies according to the position of the antenna A' provided outside the wireless module 1. As seen from Equations (1) to (3), as the antenna A' is farther away from the antenna A (as the distance d between the transmitting and receiving points increases), the Fresnel radius r of the Fresnel zone F increases. In other words, it is necessary to increase the dimension of the passage portion 31.

After intensive study by the inventors of the present application, it was found that in the case of a 60 GHz band wireless module 1, the Fresnel radius r in the vicinity of the wireless module 1 hardly changes when the distance d between the transmitting and receiving points is 0.5 m or more. Specifically, when focusing on a region in which the cover 30 is present (for example, a range of 0 [mm]×6 [mm]), it was found that even when the distance d between the transmitting and receiving points was changed by 0.5 m or more, the Fresnel radius r hardly changed.

Therefore, it is desirable to determine the dimension and position of the passage portion 31 in consideration of the Fresnel zone F of the antenna A when the distance d between the transmitting and receiving points is 0.5 m or more. The wireless module 1 according to this embodiment has a plurality of antennas A. For this reason, it is desirable to calculate the Fresnel zone F for each of the antennas A and to determine the dimension and position of the passage portion 31 so that all the calculated Fresnel zones F do not interfere with the cover 30. In the illustrated example, it is sufficient to calculate the Fresnel zone F for the antennas A located on the outermost periphery of each of the antenna groups G1 and G2.

Furthermore, the wireless module 1 may transmit and receive electromagnetic waves in a direction inclined with respect to the facing direction X. In view of this, for example, the dimension and position of the passage portion

31 may be determined in consideration of the Fresnel zone F calculated by inclining the X axis shown in FIG. 7 at a predetermined angle (for example, 45 degrees) with respect to the facing direction X of the wireless module 1. In this case, it is possible to curb interference of electromagnetic wave more reliably.

Next, an example of a method for assembling the wireless module 1 according to this embodiment will be described on the basis of FIGS. 8A to 8E.

Figure 8A:
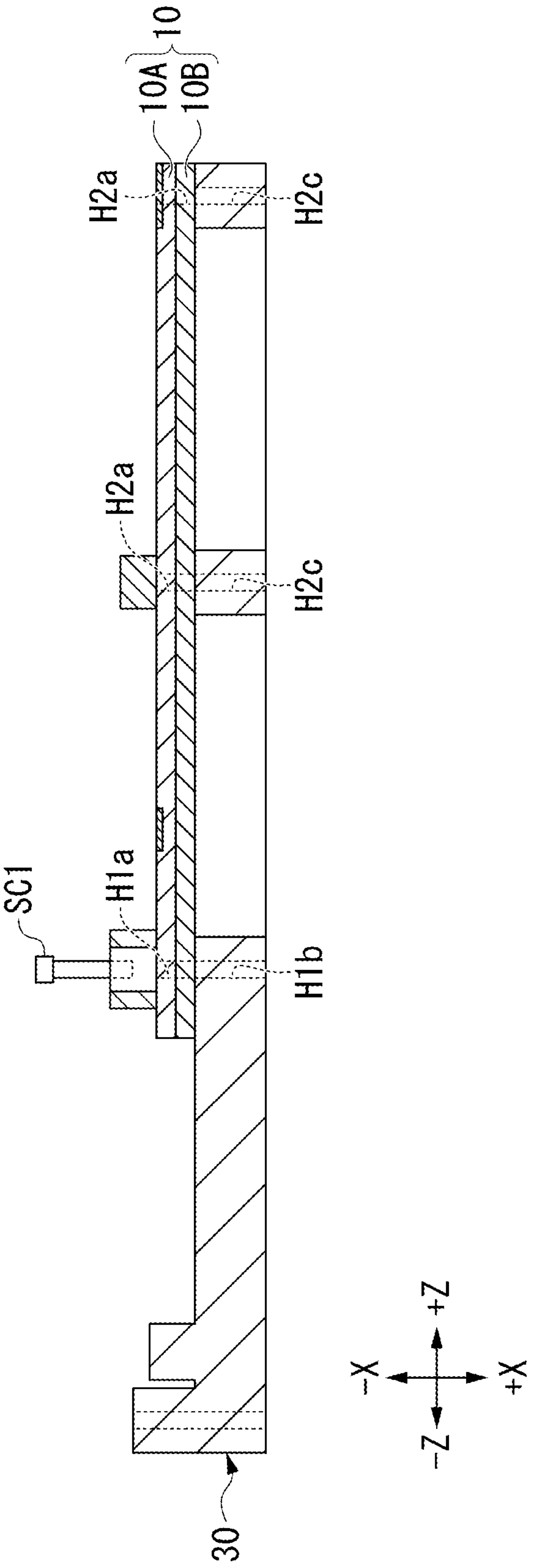
FIG. 8A is a diagram illustrating an example of a method for assembling a wireless module according to an embodiment of the present invention.

First, the cover 30 is placed on a workbench or the like. At this time, as shown in FIG. 8A, the front surface side (the +X side) of the cover 30 is directed downward in a direction of gravity. Next, the first board 10 is placed on the cover 30 so that the reinforcing portion 10B faces downward in the direction of gravity. At this time, the positioning hole H1*a* and the first screw hole H1*b* overlap in the facing direction X, and the avoidance portion H2*a* and the second screw hole H2*c* overlap in the facing direction X. Then, the positioning screw SC1 is screwed into the first screw hole H1*b* while being inserted through the positioning hole H1*a*. Then, the first board 10 is positioned and fixed to the cover 30.

Figure 8B:
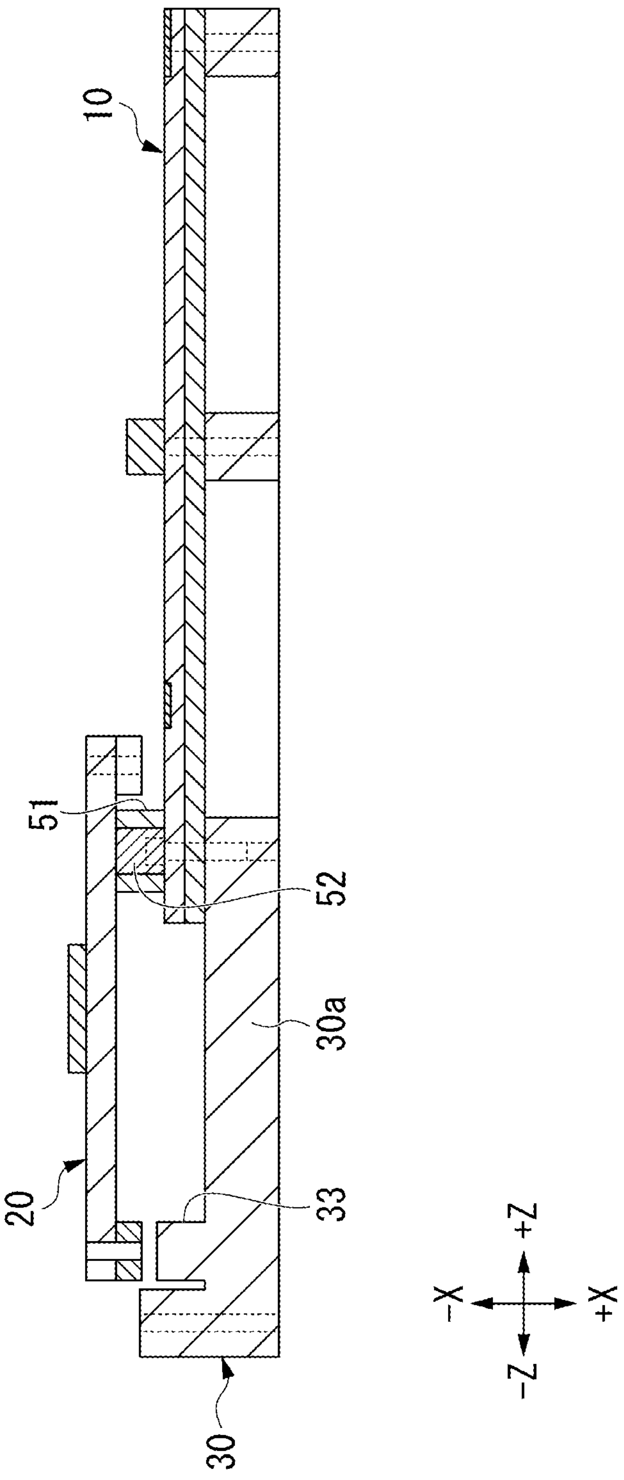
FIG. 8B is a diagram showing a state subsequent to FIG. 8A.

Next, as shown in FIG. 8B, the first board 10 and the second board 20 are electrically connected via the connectors 51 and 52. At this time, the second board 20 may be inclined due to the influence of gravity. Therefore, the cover 30 may have a support portion 33 that curbs the inclination of the second board 20, as shown in FIG. 8B. The support portion 33 is, for example, a protrusion that protrudes from the plate portion 30*a* of the cover 30 toward the back surface side (the −X side).

Figure 8C:
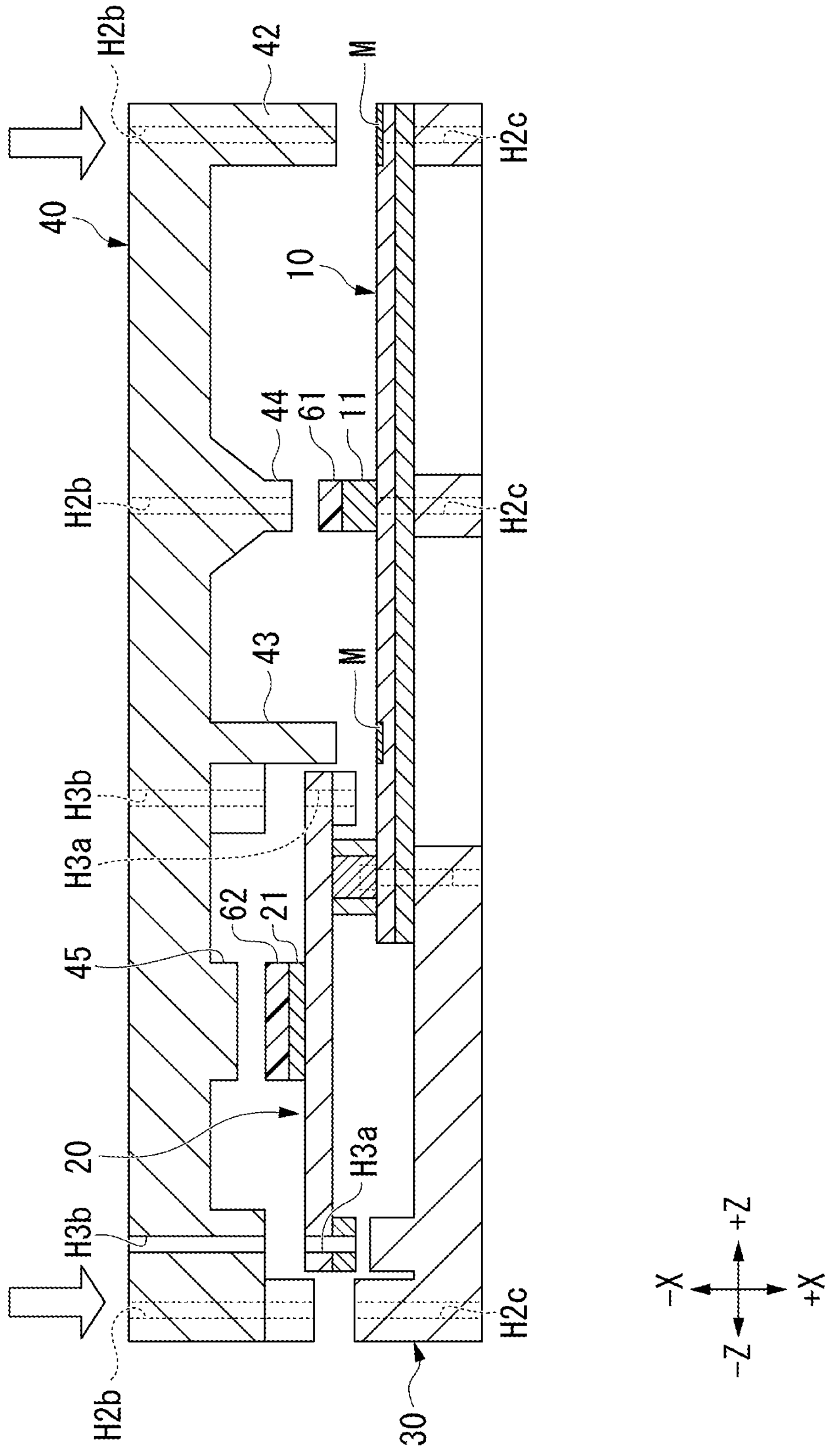
FIG. 8C is a diagram showing a state subsequent to FIG. 8B.

Next, as shown in FIG. 8C, the first heat dissipation sheet 61 is placed on the first power feeding element 11, and the second heat dissipation sheet 62 is placed on the 15 second power feeding element 21. Then, the case 40 is placed on the boards 10 and 20 and the cover 30. At this time, the peripheral wall portion 42 and the partition portion 43 are brought into contact with the metal portion M exposed on the surface of the first board 10. Further, the first heat dissipation portion 44 is brought into contact with the first heat dissipation sheet 61, and the second heat dissipation portion 45 is brought into contact with the second heat dissipation sheet 62. Further, the through hole H2*b* and the second screw hole H2*c* overlap in the facing direction X, and the second fixing hole H3*b* and the first fixing hole H3*a* overlap in the facing direction X.

Figure 8D:
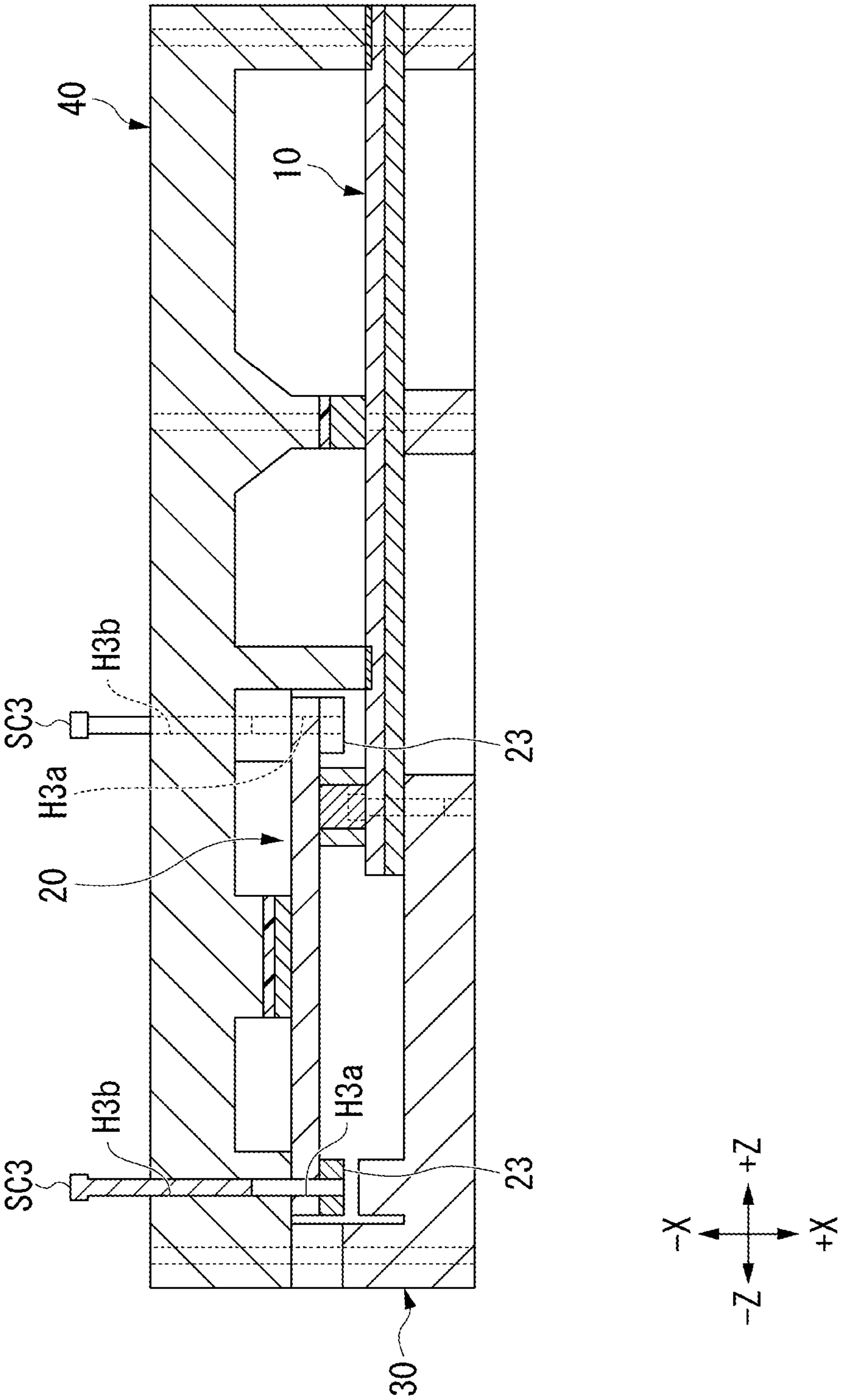
FIG. 8D is a diagram showing a state subsequent to FIG. 8C.

Next, as shown in FIG. 8D, the fixing screw SC3 is screwed into the through hole tap 23 disposed in the first fixing hole H3*a* while being inserted through the second fixing hole H3*b*. Thus, the second board 20 is fixed to the case 40.

Note that, for example, in accordance with assembly accuracy of the connectors 51 and 52, when the boards 10 and 20 are connected by the connectors 51 and 52, the position and orientation of the second board 20 may deviate from the desired position and orientation. Since the second fixing hole H3*b* has a long hole shape as described above, even when the position and orientation of the second board 20 is deviated, it is possible to fix the second board 20 to the case 40 without affecting the position of the first board 10 or the like.

Figure 8E:
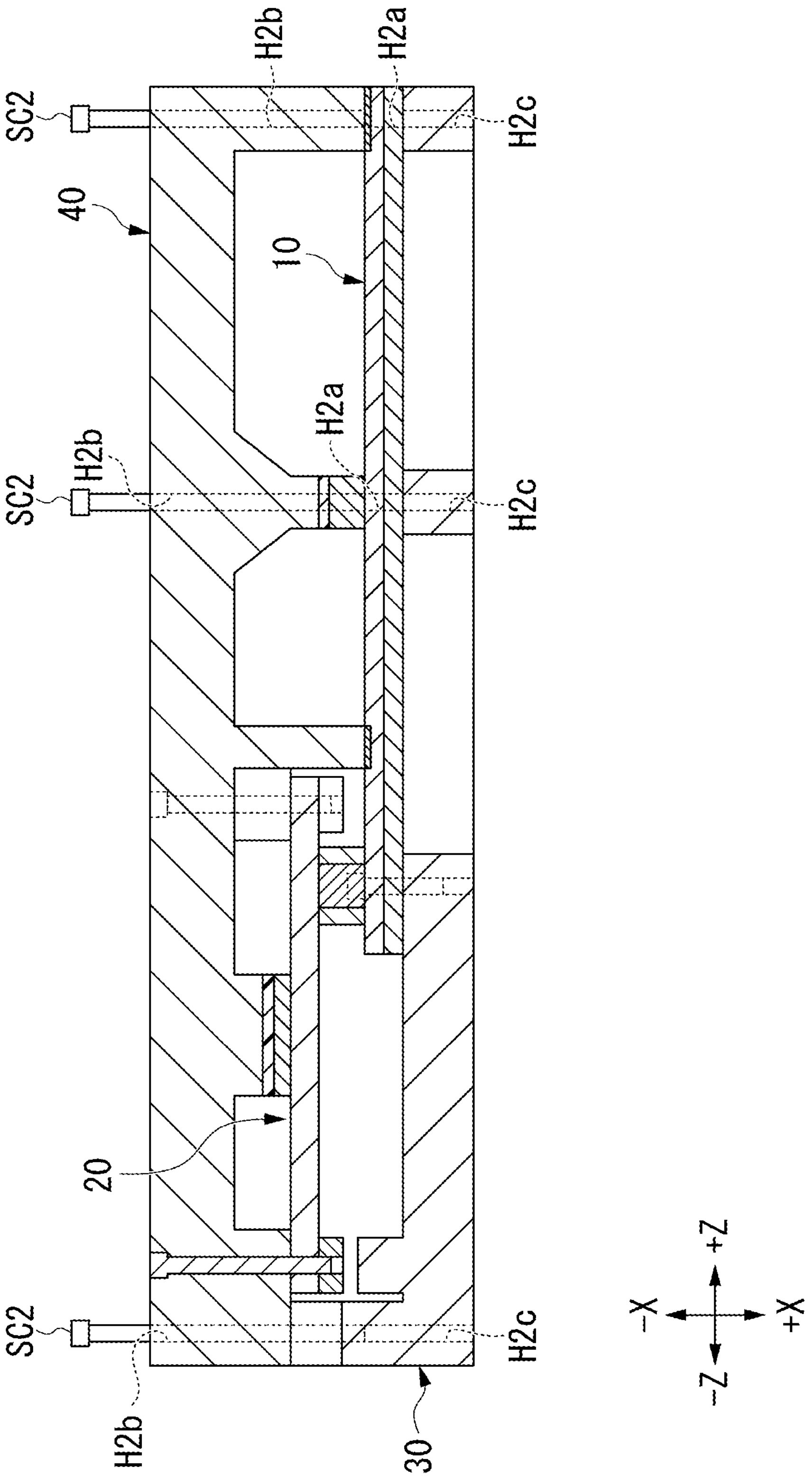
FIG. 8E is a diagram showing a state subsequent to FIG. 8D.

Finally, as shown in FIG. 8E, the through screw SC2 is screwed into the second screw hole H2*c* while being inserted through the through hole H2*b*. Thus, the case 40 is fixed to cover 30. Further, the first board 10 is more firmly fixed to the cover 30 by a pressing force of the case 40. Since the avoidance portion H2*a* is provided in the first board 10 as described above, it is possible to easily avoid structural interference between the through screw SC2 and the first board 10. Through the above steps, the assembly of the wireless module 1 is completed.

As described above, the wireless module 1 according to this embodiment includes the first board 10 having the antenna A, the antenna A transmitting and receiving a high frequency signal in a millimeter wave band, the second board 20 handling a baseband signal with a lower frequency than the high frequency signal, and the housing C including the cover 30 and the case 40 combined with each other and accommodating the first board 10 and the second board 20, in which the passage portion 31 that allows electromagnetic waves transmitted and received by the antenna A to pass through is provided in the cover 30, and the first board 10 is fixed to the cover 30 while being in contact with the cover 30.

With this configuration, the first board 10 having the antenna A is directly fixed to the cover 30 having the passage portion 31. Thus, it is possible to easily maintain the positional relationship between the antenna A and the passage portion 31. Therefore, it is possible to curb deterioration of wireless performance caused by positional deviation between the antenna A and the housing C.

Further, the first board 10 is not fixed (screwed) to the case 40. For example, when the first board 10 is screwed not only to the cover 30 but also to the case 40, the screw may pull the first board 10, and the positional relationship between the passage portion 31 and the antenna A may be disrupted. By adopting a structure in which the first board 10 is not fixed to the case 40 with screws or the like, it is possible to remove such a possibility and to maintain the positional relationship between the antenna A and the passage portion 31 more easily.

Further, the first board 10 includes the first connector 51, the second board 20 includes the second connector 52, and the first connector 51 and the second connector 52 are directly electrically connected together. When the first board 10 is not fixed to the cover 30, the position and orientation of the first board 10 may be deviated according to the accuracy with which the connectors 51 and 52 are assembled, and the positional relationship between the passage portion 31 and the antenna A may be disrupted. In the wireless module 1 according to this embodiment, since the first board 10 is fixed to the cover 30 as described above, even when the assembly accuracy of the connectors 51 and 52 is poor to some extent, it is possible to maintain the positional relationship between the antenna A and the passage portion 31, and to curb the deterioration of wireless performance.

Further, the passage portion 31 is provided so that the Fresnel zone F of the antenna A and the cover 30 do not interfere with each other. With such a configuration, it is possible to more reliably curb electromagnetic waves transmitted and received by the antenna A interfering with the cover 30. Further, since the first board 10 is fixed to the cover 30, it is possible to maintain a state in which the Fresnel zone F of the antenna A and the cover 30 do not interfere with each other.

Further, the first board 10 has a plurality of positioning holes H1*a* that position and fix the first board 10 with respect to the cover 30. With such a configuration, it is possible to easily position and fix the first board 10 to the cover 30.

Furthermore, the wireless module 1 according to this embodiment further includes the through screw SC2 that passes through the case 40, the first board 10, and the cover 30 to fix the case 40 to the cover 30. With such a configuration, the case 40 can be easily fixed to the cover 30.

Further, the first board 10 can be more firmly fixed to the cover 30 by a pressing force of the case 40 when the through screw SC2 is screwed.

Further, the first board 10 has the avoidance portion H2*a* that prevents interference between the through screw SC2 and the first board 10. With such a configuration, it is possible to easily avoid structural interference between the through screw SC2 and the first board 10.

Further, the second board 20 has the first fixing hole H3*a* that fixes the second board 20 to the case 40, the case 40 has the second fixing hole H3*b* through which the fixing screw SC3 inserted into the first fixing hole H3*a* is inserted, and the second fixing hole H3*b* has a long hole shape. With such a configuration, for example, even when the position or orientation of the second board 20 is deviated due to the assembly accuracy of the connectors 51 and 52 or the like, it is possible to fix the second board 20 to the case 40 without affecting the position of the first board 10 or the like.

Further, the through hole tap 23 is provided in the first fixing hole H3*a*. With such a configuration, it is possible to easily screw the first fixing hole H3*a* and the fixing screw SC3 together.

Further, the external terminal 22 is provided on the second board 20, among the components provided on the first board 10 or the second board 20, the components other than the antenna A and the external terminal 22 are located between the case 40 and the cover 30 in the facing direction X in which the case 40 and the cover 30 face each other, and among the components provided on the first board 10 or the second board 20, the components other than the antenna A and the external terminal 22 overlap both the case 40 and the cover 30 when seen in the facing direction X. With such a configuration, modification of the wireless module 1 may be made difficult.

Furthermore, the case 40 and the cover 30 are made of a metal. With such a configuration, it is possible to shield the first power feeding element 11 by the metal housing C (the cover 30 and the case 40), and to block unnecessary radiation.

Further, the first power feeding element 11 (the power feeding element) that supplies a current to the antenna A is mounted on the first board 10, and the first power feeding element 11 (the power feeding element) is surrounded by the case 40 and the GND of the first board 10. With such a configuration, it is possible to shield the first power feeding element 11 by the GND of the first board 10 and the case 40, and to block unnecessary radiation.

Further, the metal portion M is exposed on at least a portion of the surface of the first board 10, and the metal portion M is in electrical contact with the case 40. With such a configuration, it is possible to block unnecessary radiation from the first power feeding element 11 more reliably.

Further, the metal portion M is the GND of the first board 10. With such a configuration, it is possible to block unnecessary radiation from the first power feeding element 11 more reliably.

The technical scope of the present invention is not limited to the embodiment described above, and various changes may be made without departing from the spirit of the present invention.

For example, the positioning hole H1*a* was disposed near the first connector 51 (refer to FIG. 4) in the embodiment described above, but the position of the positioning hole H1*a* may be changed as appropriate. For example, the positioning hole H1*a* may be disposed near the antenna A, and the positioning holes H1*a* may be disposed diagonally on the first board 10. According to such configurations, it is possible to further curb deviation and rotation of the first board 10 with respect to the cover 30.

Further, the metal portion M and the case 40 were in mechanical and electrical contact (refer to FIG. 2) in the embodiment described above, but as long as the metal portion M and the case 40 are in electrical contact, the metal portion M and the case 40 do not need to be in mechanical contact. For example, a conductive sheet that is in mechanical and electrical contact with both the metal portion M and the case 40 may be provided between the metal portion M and the case 40.

Further, the second fixing hole H3*b* was provided in the case 40 in the embodiment described above, but the second fixing hole H3*b* may be provided in the cover 30. In other words, the second board 20 may be fixed to the cover 30. However, when the second fixing hole H3*b* has a long hole shape, unnecessary radiation may leak from a gap between the second fixing hole H3*b* and the fixing screw SC3. For this reason, it is desirable that the second fixing hole H3*b* having a long hole shape is provided in the case 40 instead of the cover 30.

Further, the second fixing hole H3*b* does not need to have a long hole shape. In this case, the first fixing hole H3*a* may have a long hole shape. However, when the first fixing hole H3*a* has a long hole shape, the size of the first board 10 may become large. Thus, it is desirable that the second fixing hole H3*b* has a long hole shape instead of the first fixing hole H3*a*.

Furthermore, the housing C (the cover 30 and the case 40) does not need to be made of a metal. For example, the housing C may be made of a resin or the like.

When the housing C is made of a resin, the cover 30 does not need to have an opening as the passage portion 31. In this case, the passage portion 31 may be the cover 30 itself.

In addition, the constituent elements in the above-described embodiment may be replaced with well-known constituent elements as appropriate without departing from the spirit of the present invention, and the above-described embodiment and modified example may be combined as appropriate.

EXPLANATION OF REFERENCES

1 Wireless module
10 First board
11 First power feeding element (power feeding element)
20 Second board
22 External terminal
23 Through hole tap
30 Cover
31 Passage portion
40 Case
51 First connector
52 Second connector
A Antenna
C Housing
F Fresnel zone
H1*a* Positioning hole
H2*a* Avoidance portion
H3*a* First fixing hole
H3*b* Second fixing hole
M Metal portion
SC2 Through screw
SC3 Fixing screw
X Facing direction

What is claimed is:

1. A wireless module comprising:

a first board having an antenna, the antenna transmitting and receiving a high frequency signal in a millimeter wave band;

a second board handling a baseband signal with a lower frequency than the high frequency signal; and a housing including a cover and a case combined with each other and accommodating the first board and the second board, wherein a passage portion that allows electromagnetic waves transmitted and received by the antenna to pass through is provided in the cover, the first board is fixed to the cover while being in contact with the cover, and the housing accommodating the first board and the second board inside thereof is formed by combining only two members, one of the two members is the cover, and the other of the two members is the case.

2. The wireless module according to claim 1, wherein the first board is not fixed to the case.

3. The wireless module according to claim 1, wherein the first board includes a first connector, the second board includes a second connector, and the first connector and the second connector are directly electrically connected together.

4. The wireless module according to claim 1, wherein the passage portion is provided so that a Fresnel zone of the antenna and the cover do not interfere with each other.

5. The wireless module according to claim 1, wherein the first board has a plurality of positioning holes that position and fix the first board with respect to the cover.

6. The wireless module according to claim 1, further comprising a through screw that passes through the case, the first board and the cover to fix the case to the cover.

7. The wireless module according to claim 6, wherein the first board has an avoidance portion that prevents interference between the through screw and the first board.

8. The wireless module according to claim 1, wherein the second board has a first fixing hole that fixes the second board to at least one of the case and the cover, at least one of the case and the cover has a second fixing hole through which a fixing screw inserted into the first fixing hole is inserted, and at least one of the first fixing hole and the second fixing hole has a long hole shape.

9. The wireless module according to claim 8, wherein the second fixing hole is provided in the case.

10. The wireless module according to claim 1, wherein the second board has a first fixing hole that fixes the second board to at least one of the case and the cover, and a through hole tap is provided in the first fixing hole.

11. The wireless module according to claim 1, wherein an external terminal is provided on the second board, among components provided on the first board or the second board, components other than the antenna and the external terminal are located between the case and the cover in a facing direction in which the case and the cover face each other, and among the components provided on the first board or the second board, the components other than the antenna and the external terminal overlap both the case and the cover when seen in the facing direction.

12. The wireless module according to claim 1, wherein the cover and the case are made of a metal.

13. The wireless module according to claim 12, wherein a power feeding element that supplies a high frequency signal to the antenna is mounted on the first board, and the power feeding element is surrounded by the case and a GND of the first board.

14. The wireless module according to claim 12, wherein a metal portion is exposed on at least a portion of a surface of the first board, and the metal portion is in electrical contact with the case.

15. The wireless module according to claim 14, wherein the metal portion is a GND of the first board.

* * * * *